United States Patent [19]

Ulicny

[11] Patent Number: 4,460,838
[45] Date of Patent: Jul. 17, 1984

[54] ELECTRIC MOTOR WITH BRAKING ARRANGEMENT

[75] Inventor: Dennis J. Ulicny, Carpentersville, Ill.

[73] Assignee: ECM Motor Co., Schaumberg, Ill.

[21] Appl. No.: 405,748

[22] Filed: Aug. 6, 1982

[51] Int. Cl.$^3$ .............................................. H02K 7/10
[52] U.S. Cl. ........................................ 310/76; 310/41; 188/69
[58] Field of Search ................... 310/41, 76, 77, 78; 188/69, 171

[56] References Cited

U.S. PATENT DOCUMENTS

| | | | |
|---|---|---|---|
| 2,938,606 | 5/1960 | Passman | 188/69 |
| 3,032,667 | 5/1962 | Sorchy | 310/77 |
| 3,784,852 | 1/1974 | Noly | 310/76 |

Primary Examiner—Donovan F. Duggan
Assistant Examiner—Anita M. Ault
Attorney, Agent, or Firm—Dressler, Goldsmith, Shore, Sutker & Milnamow, Ltd.

[57] ABSTRACT

An electric motor having an improved braking arrangement is disclosed. The braking arrangement includes a stop pawl armature assembly disposed coaxially upon the rotor shaft of the motor for axial movement with respect thereto in response to the magnetic field created by the stator assembly of the motor. The braking arrangement further includes a stop member disposed on the rotor shaft arranged to normally rotate therewith. The stop member functions in the nature of a slip clutch, and is adapted to cooperate with the armature assembly for effecting braking of the motor. During motor operation, the armature assembly is shifted by the magnetic field of the motor stator assembly so that a pawl portion of the armature assembly is moved out of the rotational path of a lobe portion of the stop member. When the motor is switched off, the pawl portion of the armature assembly is moved into the path of the lobe portion, and is engaged thereby. The stop member permits limited continued rotation of the motor rotor until the torque of the rotor shaft drops below the torque-carrying capacity of the stop member slip clutch, at which time the shaft stops rotating and is firmly held against continued rotation.

18 Claims, 5 Drawing Figures

ELECTRIC MOTOR WITH BRAKING ARRANGEMENT

TECHNICAL FIELD

The present invention relates generally to electric motors, and more particularly to an improved electric motor construction including a brake arrangement for quickly stopping rotation of the motor shaft after power is switched off, and for preventing rotation of the shaft when the motor is not operating.

BACKGROUND OF THE INVENTION

For many applications of electric motors, it is desirable to provide a braking arrangement for the motor which acts to quickly stop rotation of the motor's shaft when electric power to the motor is switched off, and to thereafter prevent rotation of the shaft. Such braking arrangements are typically disengaged or otherwise deactivated when power to the motor is again switched on, so that the motor turns freely during operation.

Heretofore, two types of braking arrangements for electric motors have commonly been employed, particularly for use in relatively small electric motors. However, each of these arrangements presents inherent limitations which detract from the versatility of their application.

One type of commonly used braking arrangement is a so-called pawl brake. In this type of brake arrangement, a pair of brake pads are mounted on the rotor shaft of the motor and are spring-biasing into frictional engagement. One of the brake pads is firmly fixed to the rotor shaft while the other pad typically includes a ratchet for effecting braking. The rachet is engageable by a radially movable pawl attached to the motor frame. During operation of the motor, a steel arm spanning a portion of the motor's stator moves due to the the magnetic field created, thereby pulling the pawl out of engagement with the ratchet and allowing the rotor to rotate. When power is turned off, a spring re-engages the pawl with the ratchet, with the friction thereby generated between the brake pads stopping rotation of the rotor. The shaft is thereafter substantially locked against rotation by the biased engagement of the brake pads, one being fixed to the shaft, and the other held fixed with respect to the motor frame by the pawl and rachet mechanism.

Although this type of pawl braking arrangement acts to stop rotor rotation relatively quickly, and locks the rotor firmly when power is off, this type of brake is undesirably noisy because of the steel arm used for operating the brake pawl. The steel arm is also undesirably disposed outside of the motor frame, which can easily result in damage to the mechanism. Further, because of the typical configuration of the pawl, it is almost impossible for this type of braking arrangement to function properly in both clockwise and counterclockwise directions of rotor rotation. Because of the steel arm's spanning of a portion of the stator, this type of brake arrangement cannot be used on many types of motors, such as motors having an unsuitable stator configuration.

Another type of commonly used braking arrangement for electric motors is a so-called disc brake (sometimes referred to as a cone brake). For this type of brake, the rotor shaft is axially shiftable with respect to the stator of the motor, with a brake pad attached to the rotor shaft. A spring is arranged to axially shift the rotor off-center of the stator in order to urge the brake pad on the rotor shaft into engagement with a stationary brake pad. When the motor is operated, the magnetic solenoid force created by the stator acts to pull or shift the rotor shaft against the spring force so that the brake pads are disengaged from each other, thereby allowing the shaft to rotate. When power is turned off, the spring axially shifts the rotor shaft so that brake pads again engage each other.

While this type of disc braking arrangement can work equally well in both clockwise and counterclockwise rotor rotations, the relatively small biasing force of the spring results in the creation of relatively low braking forces. Consequently, the stopping travel of the rotor is undesirably relatively great, frequently on the order of 6 to 20 revolutions after engagement of the brake pads. Further, this type of braking arrangement does not act to firmly lock the rotor against rotation when power to the motor is off. The necessary axial movement of the shaft severely limits the type of axial loading that can be applied to the shaft by the external load that the motor is driving. It also makes proper functioning of the brake sensitive to the force of gravity (due to the large weight of the rotor), complicating operation when the motor is not mounted horizontally. If the connection of the shaft to the load increases the axial friction force on the shaft as the torque load increases (such as on a gear drive), the starting torque of the motor will be lowered. As will be appreciated, the axial shifting of the rotor attendant to activation and deactivation of the brake essentially precludes use of a helical cut pinion on the rotor shaft for power delivery, and prevents use of rolling element bearings.

Because of the desirability of providing a braking arrangement for all manner of electric motors, the introduction of an effective braking arrangement which is readily suited for use in a wide variety of applications, and which overcomes many of the disadvantages associated with braking arrangements heretofore known, represents a significant development.

SUMMARY OF THE INVENTION

In accordance with the present invention, an electric motor having an improved braking arrangement is disclosed, the nature of the braking arrangement greatly enhancing the versatility of its application to a wide variety of different types of motors. Significantly, the present invention overcomes many of the disadvantages associated with previously known braking arrangements. When the brake is activated, the motor's rotor shaft is firmly restrained against rotation, yet the nature of the arrangement permits its operation regardless of the direction of rotation of the rotor. The braking arrangement generates high braking forces for quick stopping, will accomodate virtually any type of axial load, and can be used with any type of gearing with no loss in starting torque because of the gearing. Significantly, the present braking arrangement can be used on a very wide range of motors. The arrangement is very quiet during operation, is desirably compact so that it can be easily positioned entirely within the motor frame, can properly function regardless of the physical orientation of the motor, and can be used with rolling element bearings.

The present electric motor includes a rotor, typically comprising a rotor core fixedly mounted on a rotor shaft. The motor further includes a stator assembly through which the rotor extends, with the rotor being supported for rotation by a motor frame to which the stator assembly is connected. Notably, the motor frame maintains the rotor in substantially axially fixed relation to the stator assembly.

The braking arrangement for the motor is operatively disposed on the rotor, and includes a novel stop pawl armature assembly disposed on the rotor shaft for axial movement with respect thereto. The stop pawl armature assembly is positioned generally adjacent one end of the motor stator assembly, and includes a portion which is adapted to engage part of the motor frame so that the rotor shaft freely rotates within the armature assembly while the armature assembly remains rotationally fixed with respect to the frame.

The armature assembly moves axially with respect to the rotor shaft in response to a magnetic field created during motor operation, preferably the magnetic field of the stator assembly. When power to the motor is switched on, the magnetic field of the stator assembly acts on the armature assembly to shift the armature assembly generally in the direction of the stator assembly in opposition to biasing means operatively associated with the armature assembly, which preferably comprises a coil spring disposed coaxially about the rotor shaft between the rotor core and armature assembly. In this manner, the stop pawl armature assembly is moved to a first, disengaged position which permits the rotor to turn freely. When power is switched off, the biasing spring acts to urge the armature assembly in an opposite direction axially of the rotor shaft to a second, engaged position.

The braking arrangement of the present invention further includes a stop member mounted on the rotor shaft in generally spaced relation to the armature assembly, and which is adapted to cooperate with the armature assembly for effecting positive braking of the rotor shaft. The stop member comprises a slip clutch having a limited torque-carrying capacity. The stop member includes a lobe portion which is adapted to engage a pawl portion of the stop pawl armature assembly when the armature assembly is in its second, engaged position. Thus, the stop member rotates with the rotor shaft during motor operation, with the lobe portion of the stop member engaging the pawl portion of the armature assembly when power is switched off and the armature assembly moves to its second, engaged position.

Because the stop member functions as a slip clutch, limited rotation of the rotor shaft is permitted after engagement of the lobe portion of the stop member with the pawl portion of the armature assembly. Rotation of the rotor shaft continues only so long as its inertial torque exceeds the torque-carrying capacity of the stop member slip clutch. Thus, after engagement of the stop member with the armature assembly, the rotor shaft quickly slows and stops by the torque-absorbing action of the slip clutch. Thereafter, the rotor shaft can only be rotated if the torque of the shaft exceeds the "breakaway torque" of the slip clutch. This arrangement desirably firmly locks the rotor shaft against rotation, but avoids the creation of excessively high stresses which can occur if the rotor shaft is stopped too quickly.

Numerous other advantages and features of the present invention will become readily apparent from the following detailed description of the invention and embodiment thereof, from the claims and from the accompanying drawings in which like numerals are employed to designate like parts throughout the same.

BRIEF DESCRIPTION OF THE DRAWINGS

FIG. 5 is a view similar to FIG. 4 illustrating the braking arrangement of the present invention in its disengaged condition with the electric motor switched on.

DETAILED DESCRIPTION

While the present invention is susceptible to embodiment in various forms, there is shown in the drawings and will hereinafter be described a presently preferred embodiment with the understanding that the present disclosure is to be considered as an exemplification of the principles of the invention and is not intended to limit the invention to the specific embodiment illustrated.

Figure 1:
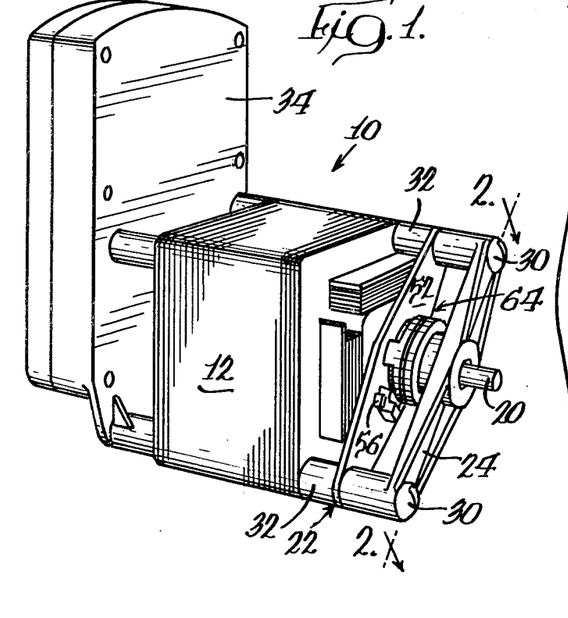
FIG. 1 is a perspective view of an electric motor having a braking arrangement embodying the present invention.
Figure 2:
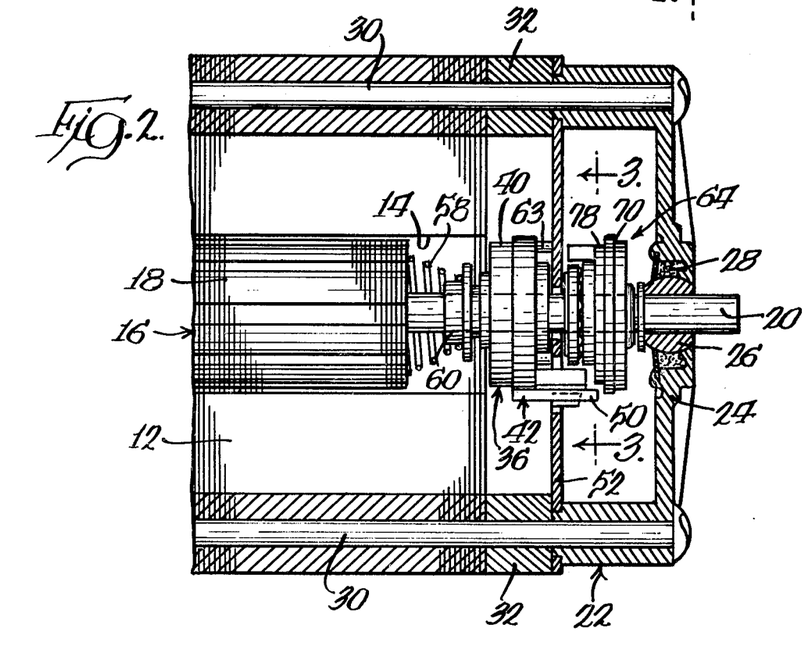
FIG. 2 is an enlarged, partial cross-sectional view taken generally along lines 2—2 of FIG. 1.

With reference now to FIGS. 1 and 2, therein is illustrated an electric motor 10 embodying the present invention. As illustrated, motor 10 is an induction motor of the so-called permanent split capacitor type. However, as will be readily appreciated by those familiar with the art, an electric motor having a braking arrangement which embodies the present invention can be any of a variety of types. This is an important feature of the present invention in view of the heretofore unattainable versatility which is provided by the present braking arrangement. Motor 10 has been illustrated as a permanent split capacitor type motor since some previously known braking arrangements have not been suited for use with this type of motor, but it will be appreciated that the exact construction of motor 10 as illustrated is meant as illustrative and not limiting.

Motor 10 includes a stator assembly 12, typically comprising a plurality of laminated plates. Stator assembly 12 defines a bore 14 through which extends a motor rotor generally designated 16. Rotor 16 is concentrically disposed within the bore 14, and typically includes a rotor core 18 fixedly mounted to an elongated rotor shaft 20.

Motor 10 further includes a motor frame, generally designated 22, which supports rotor 16 for rotation of the rotor with respect to stator assembly 12. Frame 22 typically includes an end frame portion 24, sometimes referred to as a bearing bracket, which houses a bearing 26 which rotatably supports rotor shaft 20. Bearing 26 can typically comprise a sintered metallic material which provides the bearing with a porous nature for purposes of lubrication. A lubricant reservoir 28 (shown in FIG. 2 only) can typically comprise felt or a like absorbent material whereby an adequate supply of lubricant can be provided for the bearing 26 during manufacture of the motor to assure long service life.

Motor frame 22 further includes a pair of elongate frame members 30, typically comprising elongate mechanical fasteners, which extend through end frame portion 24, frame spacers 32, and stator assembly 12. Frame members 30 are connected with a gear box 34, which further provides a portion of the motor frame. As will be appreciated, gear box 34 includes a suitable bearing assembly (not shown) for further rotatable support of rotor shaft 20. Power from motor 10 is taken from the end of rotor shaft 20 disposed within gear box 34, with torque-multiplying gearing typically provided in the gear box. Naturally, an electric motor embodying the present invention need not have a gear box such as 34, which has been illustrated merely for showing the typical construction of a relatively small electric motor.

In accordance with the present invention, electric motor 10 includes a braking arrangement which permits rotor 16 to turn freely during motor operation, but which acts to quickly stop rotor rotation when power to the motor is switched off and thereafter substantially prevents rotor rotation. As best illustrated in FIGS. 2–5, the present braking arrangement includes a stop pawl armature assembly 36 which is operatively associated with rotor 16 by disposition of the armature assembly 36 on rotor shaft 20. As will be further described, armature assembly 36 is axially movable with respect to rotor shaft 20 between a first, disengaged position (FIG. 5) wherein rotor 16 can freely turn, and a second, engaged position (FIG. 4) wherein braking of rotor 16 is effected attendant to motor operation ceasing.

Armature assembly 36 includes a hub 38 disposed on rotor shaft 20 such that the rotor shaft is freely rotatable within the hub 38, with the entire armature assembly 36 being axially movable with respect to the rotor shaft. Hub 38 preferably comprises a suitable bearing material to facilitate free rotation of rotor shaft 20 therein.

Armature assembly 36 further includes an armature 40 firmly affixed to hub 38, such as by a press fitting or the like. Armature 40 preferably comprises a ferrous material which thereby provides axial movement of armature assembly 36 with respect to rotor shaft 20 in response to the magnetic field created by stator assembly 12 during motor operation. Thus, when motor 10 is switched on, the magnetic field created by stator assembly 12 is shorted through armature 40 which acts to shift armature assembly 36 from the position illustrated in FIG. 4 generally toward the stator assembly to the position illustrated in FIG. 5. Since the field through armature 40 increases as it moves toward the stator bore 14, there is a net magnetic force pulling it in that direction, thereby repositioning armature assembly 36. This unique action provides operation of the present braking arrangement, yet desirably permits the braking arrangement to be relatively compact, and permits it to function in the intended manner with a wide variety of different types of electric motors.

Although armature assembly 36 has been illustrated as movable in response to the magnetic field created by stator assembly 12, for some applications it may be desirable to create a magnetic field for movement of the armature assembly separate from the field of stator assembly 12. This can be done by providing coil means apart from the stator assembly to create the magnetic field for movement of armature assembly 36. Such coil means can be arranged to shift armature assembly 36 away from stator assembly 12, if desired, the other components of the braking arrangement having been suitably repositioned on the rotor shaft. Such coil means can be selectively operable to permit disengagement of the present braking arrangement apart from motor operation. The arrangement illustrated is desirably compact and relatively economical to fabricate. However, variations from the illustrated embodiment can readily be made in accordance with the teachings herein for effecting shaft braking.

The armature assembly 36 further includes a stop pawl member generally designated 42. Pawl member 42 is disposed about hub 38, and is fixed against rotation with respect to the hub such as by a partial key 44 of the hub 38 which is positioned within a keyway 46 defined by pawl member 42. Pawl member 42 is arranged so that it shifts axially of rotor shaft 20 attendant to the magnetic force which acts upon armature 40.

Figure 4:
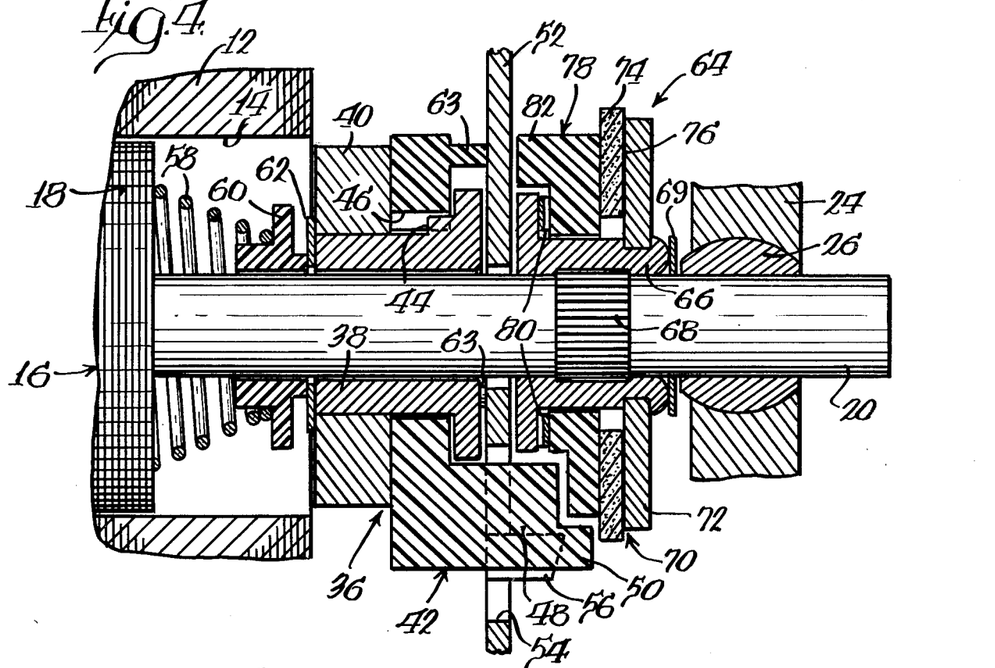
FIG. 4 is a view taken along lines 4—4 of FIG. 3 illustrating the braking arrangement of the present invention in an actuated position with the electric motor switched off.

Pawl member 42 includes a pawl portion 48, and can further include a lock portion 50. Pawl portion 48 extends generally away from the stator assembly 12 of the motor 10, and is provided for effecting the braking action for the motor. A stop plate 52, illustrated as extending between frame members 30, is spaced from stator assembly 12 and is positioned in close association with the armature assembly 36. Stop plate 52 may comprise a portion of the motor frame 22 or may be suitably connected to the frame, with rotor shaft 20 extending through the stop plate. The stop plate 52 defines an aperture 54 through which pawl portion 48 of pawl member 42 is adapted to extend when armature assembly 36 is in its second, engaged position (FIG. 4). If desired, stop plate 52 can be provided with one or more stop ears 56 which are adapted to engage lock portion 50 of pawl member 42 for preventing rotation of armature assembly 36 with respect to motor frame 22 and stator assembly 12. As will be appreciated, the exact configuration of pawl member 42 can be varied, so long as armature assembly 36 is substantially prevented from rotating with respect to the motor frame, with pawl portion 48 being arranged to extend through stop plate 52 when the armature assembly 36 is in its second, engaged position.

As noted above, armature assembly 36 shifts from its second, engaged position to its first, disengaged position in response to the magnetic field created by stator assembly 12. In order to shift the armature assembly from its disengaged position back to its engaged position, biasing means are provided operatively associated with armature assembly 36, and which act in opposition to the force exerted on the armature assembly by the magnetic field of the stator assembly. In the illustrated embodiment, this biasing action is provided by compression spring 58 disposed generally coaxially upon rotor shaft 20 adjacent rotor core 18. Compression spring 20 acts through collar 60 disposed on rotor shaft 20, which further acts through thrust washer 62 to exert the desired biasing force on armature assembly 36. Collar 60 is preferably arranged so that rotor shaft 20 can freely rotate therein. However, because spring 58 and collar 60 tend to rotate with rotor shaft 20 during motor operation, the thrust washer 62 is preferably provided to afford a relatively low frictional interface between the rotating collar 60 and the non-rotating armature assembly 36. As will be appreciated, the exact configuration of the biasing arrangement for the armature assembly 36 can be varied without deviation from the teachings herein.

Figure 5:
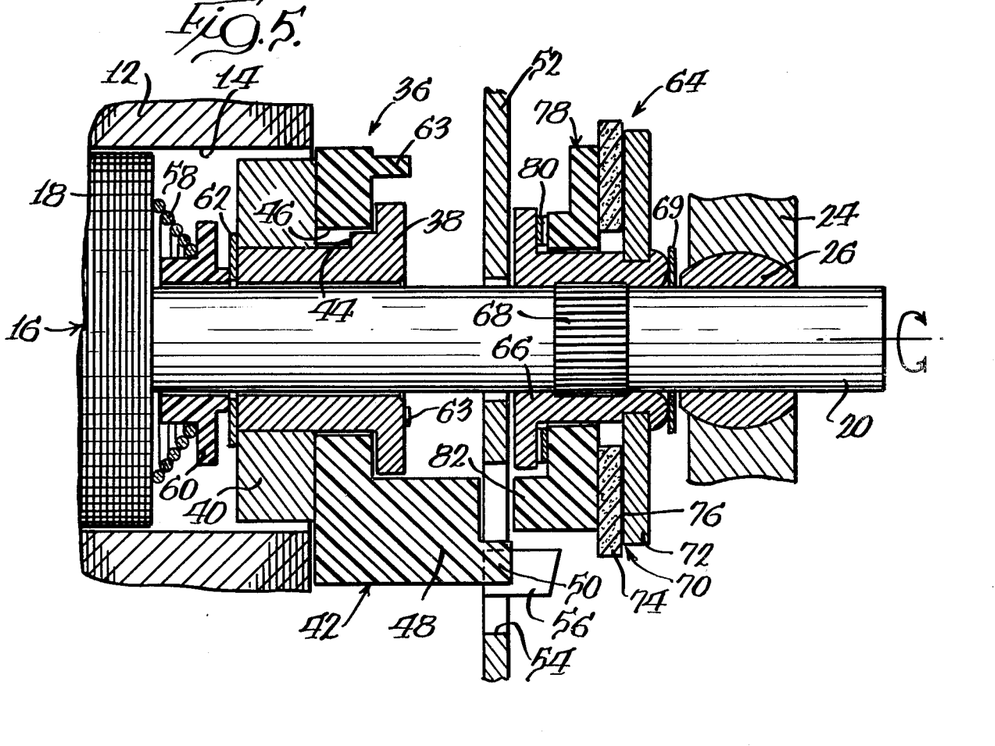

As illustrated in FIG. 5, the biasing arrangement for armature assembly 36 is preferably configured so that collar 60 is slightly spaced from rotor core 18 when armature assembly 36 is in its first, disengaged position, with spring 58 not fully compressed. In this manner, the magnetic forces acting on armature 40 when armature assembly 36 is in its disengaged position are essentially balanced by or equal to the biasing force of spring 58, with the armature assembly thereby maintained in a state of equilibrium in its disengaged position. This "floating" arrangement for armature assembly 36 is preferred since excessive vibration can be induced in the armature assembly 36 and the motor 10 during operation if the armature assembly is arranged to be positively stopped (such as by engagement of collar 60 with rotor core 18) as it moves axially on rotor shaft 20 attendant to the magnetic forces acting upon it. Additionally, this preferred floating arrangement for the armature assembly has been found to desirably provide relatively quiet motor operation.

In applications in which motor 10 is mounted other than horizontally, the force of gravity does not impair correct positioning of armature assembly 36 or proper motor braking. This is because the geometry of the stator magnetic field is such that changes in the biasing forces on the armature assembly are reflected only as relatively small changes in the axial positioning of the armature assembly. This is a very desirable feature of the present invention since it permits correct operation of the braking arrangement regardless of the disposition of the motor, further enhancing its versatility of application.

For some applications of the present invention, it can be desirable to provide shock absorption means adapted to operate in association with the armature assembly 36 attendant to movement of the armature assembly toward stop plate 52 to its second, engaged position. This can be helpful in preventing undesired "rebound" or bouncing action when the armature assembly is moved against the stop plate 52 to its engaged position by spring 58. In the illustrated embodiment, such shock absorption means are provided by one or more projections 63 (three being illustrated) on pawl member 42 which are adapted to engage stop plate 52 when the armature assembly 36 moves into its second, engaged position (the pawl member 42 being made of a suitably resilient material, such as plastic). Other suitable shock absorption means can be provided, such as by the disposition of a washer of elastomeric material on rotor shaft 20 between hub 38 and stop plate 52.

The braking arrangement of the present invention further includes a stop member 64 which is adapted to cooperate with armature assembly 36 for effecting braking of rotor 16. As best illustrated in FIGS. 4 and 5, stop member 64 is essentially a slip clutch having a limited torque-carrying capacity. This arrangement is desirable since it permits limited rotation of the rotor 16 after activation of the braking arrangement, yet functions quickly to firmly lock the rotor 16 against rotation.

Stop member 64 includes a hub 66 which is fixed to rotor shaft 20 by splines 68 for rotation with the rotor shaft. If desired, a thrust spacer 69 can be provided operatively disposed on rotor shaft 20 between hub 66 and bearing 26. Significantly, this arrangement acts to hold rotor 16 in generally axially fixed relation to motor frame 22 and stator assembly 12. This is in distinction to some braking arrangements previously known in which axial shifting of the rotor is necessary in order to effect braking. Desirably, the axially fixed disposition of rotor 16 permits use of helical cut gearing on the output end of the rotor shaft.

Stop member 64 further includes a friction plate, generally designated 70. The friction plate 70 is firmly affixed to hub 66, and thus is arranged to rotate with rotor shaft 20. Friction plate 70 preferably includes a generally disc-like plate 72 affixed to hub 66, and an annular friction member 74 affixed to plate 72 such as by adhesive 76. Friction member 74 provides friction plate 70 with a highly frictional surface, and can be suitably fabricated from cork or like materials which are typically employed in clutch assemblies.

Stop member 64 further includes a clutch plate 78 disposed on hub 66 such that clutch plate 78 is rotatable with respect to the hub 66. Biasing means are provided in operative association with the hub 66 and the clutch plate 78 so that clutch plate 78 is urged into firm frictional engagement with friction member 74 of friction plate 70. In the embodiment illustrated, biasing of clutch plate 78 is provided by wave spring washer 80 disposed operatively on hub 66 between the hub and clutch plate 78. Thus, during operation of motor 10, clutch plate 78 normally rotates together with hub 66 and friction plate 70, with the assembly having a predetermined torque-carrying capacity as determined by the frictional forces generated between the spring-biased clutch plate 78 and the friction plate 70.

Figure 3:
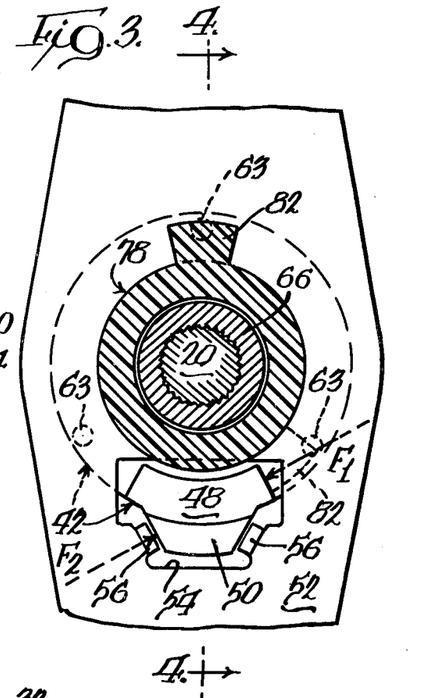
FIG. 3 is a further enlarged view taken generally along lines 3—3 of FIG. 2.

In order to effect braking of electric motor 10, clutch plate 78 is arranged so as to positively engage pawl portion 48 of pawl member 42 when armature assembly 36 is in its second, engaged position. To this end, clutch plate 78 includes a lobe portion 82 which is positioned in close proximity to stop plate 52 and which projects away from friction plate 70. Thus, when armature assembly 36 is in its second, engaged position, stop member 64 acts to quickly slow and thereafter prevent rotation of rotor 16 since pawl portion 48 is within the path of rotation of the lobe portion 82. This is illustrated in FIG. 3 in which pawl portion 48 is illustrated as extending through aperture 54 defined by stop plate 52, with lobe portion 82 thereby adapted to engage the pawl portion 48. Significantly, engagement of lobe portion 82 with pawl portion 48 is effected without regard to the direction of rotation of motor 10 during its operation. This is an important feature of the present invention since the present braking arrangement readily permits operation of motor 10 in either clockwise or counterclockwise rotations. If pawl member 42 is provided with a stop portion such as 50 as illustrated, lobe portion 82, as well as other portions of clutch plate 78, are arranged so as to clear the lock portion 50 when motor 10 is operating and armature assembly 36 is in the first, disengaged position.

As also illustrated in FIG. 3, the lobe portion 82, the pawl portion 48, and the stop ears 56 are preferably configured so that the force on pawl portion 48 attendant to engagement by lobe portion 82 (illustrated by phantom arrow $F_1$) is substantially coaxially aligned and opposite the force on the pawl portion by stop ear 56 (illustrated by phantom arrow $F_2$). This is particularly desirable since bending moments which might otherwise be created in the pawl member 42 are substantially eliminated. Forces generated attendant to engagement of pawl portion 48 by lobe portion 82 are desirably transmitted directly into stop plate 52 with minimum shear stresses created in the pawl member 42.

From the foregoing description, operation of the present electric motor braking arrangement will be readily apparent. When power to the motor is switched on, the magnetic field created by stator assembly 12 very quickly repositions armature assembly 36 axially of rotor shaft 20 in opposition to compression spring 58. Thus, the armature assembly shifts from its engaged position illustrated in FIG. 4 to its disengaged position illustrated in FIG. 5. By this action, pawl portion 48 of pawl member 42 is moved clear of the rotational path of lobe portion 82 of clutch plate 78. Relatively high starting torque and rotor acceleration result, with armature assembly 36 remaining relatively fixed against rotation with respect to stator assembly 12 and motor frame 10 by engagement of pawl member 42 with stop plate 52. During motor operation, stop member 64 rotates together with the rotor 16.

When power to motor 10 is switched off and motor operation ceases, compression spring 58 urges armature assembly 36 from its first, disengaged position to its second, engaged position to effect braking of rotor 16. By this action of the armature assembly, pawl portion 48 of pawl member is shifted with respect to stop plate 52 so that pawl portion 48 extends through the stop plate into the path of lobe portion 82 of the rotating clutch plate 78. Lobe portion 82 thus firmly engages pawl portion 48, and stops rotation of clutch plate 78. Because of the inertial forces which exist in the rotor 16, limited rotation of the rotor occurs after engagement of lobe portion 82 with pawl portion 48 until the torque of rotor shaft 20 drops below the breakaway torque of the slip clutch provided by stop member 64. Thus, the friction created between the non-rotating clutch plate 78 and the rotating friction plate 70 quickly absorbs the inertial torque of the rotor 16 until the torque of the rotor drops below the torque-carrying capacity of the slip clutch. When this occurs, rotor 16 stops completely, with continued rotation of the rotor prevented so long as the torque of rotor shaft 20 does not exceed the torque-carrying capacity of the slip clutch. Thus, limited rotation of rotor 16 is permitted after engagement of lobe portion 82 with pawl portion 48, with the rotor 16 typically coming to a complete stop within a few revolutions. When power to the motor is again switched on, armature assembly 36 is again shifted axially on rotor shaft 20 so that pawl portion 48 is clear of the rotational path of lobe portion 82, and the motor can then operate in a normal fashion.

As noted, the present electric motor braking arrangement has been found to provide relatively high starting torque and rotor acceleration. Desirably, no moving parts extend past the frame of the motor, in distinction from previously known pawl brakes. In operation, the present braking arrangement is relatively quiet, with its suitability for various types of electric motors and its functionality regardless of the direction of rotor rotation and motor orientation greatly enhancing the versatility of the arrangement.

From the foregoing, numerous variations and modifications may be effected without departing from the true spirit and scope of the novel concept of the present invention. It will be understood that no limitation with respect to the specific apparatus illustrated herein is intended or should be inferred. It is, of course, intended to cover by the appended claims all such modifications which fall within the scope of the claims.

What is claimed is:

1. An electric motor, comprising:
a motor frame;
a stator assembly connected to said frame;
rotor means extending through said stator assembly supported by said motor frame for rotation with respect thereto and with respect to said stator assembly; and
brake means operatively disposed on said rotor means, including stop means held against rotation with said rotor means and movable axially with respect to said rotor means between engaged and disengaged positions, said stop means being maintained in said disengaged position by the magnetic field created by said stator assembly during operation of the motor so that said rotor means is rotatable with respect to said motor frame, said stop means moving to said engaged position when said motor is not operating, said brake means further including a stop member carried by said rotor means and rotatable with said rotor means during motor operation, said stop means being adapted for engagement with said stop member to operatively connect said stop member to said motor frame in said engaged position so that said brake means act to prevent retation of said rotor means with respect to said motor frame.

2. The electric motor in accordance with claim 1, wherein
said stop means include armature means disposed on said rotor means axially movable with respect thereto,
said brake means further including biasing means operatively associated with said armature means, said armature means being movable with respect to said rotor means in opposition to said biasing means in response to the magnetic field created by said stator assembly during operation of said motor whereby said stop means move to said disengaged position, said biasing means urging said stop means to said engaged position when said motor is not operating.

3. The electric motor in accordance with claim 1, wherein
said stop member includes means permitting limited rotation of said rotor means after engagement of said stop means with said stop member.

4. The electric motor in accordance with claim 1, wherein
said stop member includes clutch means for permitting limited rotation of said rotor means after engagement of said stop means with said stop member.

5. Am electric motor, comprising:
a motor frame;
a stator assembly connected to said frame;
a rotor extending through said stator assembly supported by said motor frame for rotation with respect to said stator assembly and said motor frame; and
brake means operatively associated with said rotor including means movable axially of said rotor in response to a magnetic field created during operation of said motor, said brake means permitting rotation of said rotor with respect to said stator assembly during operation of said motor, said brake means substantially preventing rotation of said rotor with respect to said stator assembly when said motor is not operating without regard to the direction of rotation of said rotor during operation of said motor,
said brake means including a stop member comprising slip clutch means, said stop member being carried by and rotatable with a rotor shaft of said rotor during motor operation, said movable means being adapted to operatively connect said stop member to said motor frame when motor operation ceases.

6. The electric motor in accordance with claim 5, wherein said movable means comprise stop means disposed on said rotor shaft, said stop means being adapted to engage a portion of said motor frame to prevent rotation of said stop means with respect to said motor frame;

said stop means being movable to a disengaged position in response to the magnetic field created during motor operation so that said stop member does not engage said stop means and said rotor is rotable with respect to said stator assembly, said stop means being further movable to an engaged position when motor operation ceases so that said stop means are engageable by said stop member to operatively connect said stop member to said frame to substantially prevent rotation of said rotor with respect to said motor frame.

7. The electric motor in accordance with claim 6, wherein said slip clutch means comprises torque absorption means for permitting limited rotation of said rotor with respect to said motor frame after engagement of said stop means by said stop member.

8. The electric motor in accordance with claim 7, wherein said slip clutch means comprises a friction plate fixed with respect to said rotor, and a clutch plate spring-biased into frictional engagement with said friction plate, said clutch plate including a portion adapted to engage said stop means in the engaged position thereof, so that after engagement of said clutch plate portion with said stop means, said rotor is rotatable only when its rotational torque exceeds the torque-carrying capacity of the slip clutch means as determined by the frictional forces generated between said clutch plate and friction plate.

9. An electric motor in accordance with claim 5 or 8, wherein the magnetic field created during motor operation comprises the magnetic field created by said stator assembly.

10. An electric motor having a brake arrangement, comprising:

a motor frame;

a stator assembly connected to said frame;

a rotor extending through said stator assembly including a rotor shaft and a rotor core affixed to said rotor shaft, said motor frame supporting said rotor for rotation thereof with respect to said stator assembly and said motor frame;

pawl means including an armature mounted on said rotor shaft and axially movable with respect thereto, said pawl means being movable axially of said rotor shaft to a first, disengaged position in response to the magnetic field created by said stator assembly acting upon said armature when said motor is operated, said pawl means being axially movable of said rotor shaft to a second, engaged position when motor operation ceases by biasing means operatively associated with said pawl means, said pawl means including means adapted to prevent rotation of said pawl means with respect to said motor frame;

a stop member mounted on said rotor shaft adapted to normally rotate with said rotor shaft, said stop member being axially fixed with respect to said rotor shaft, said stop member being adapted to engage said pawl means only when said pawl means is in said second, engaged position whereby engagement of said stop member with said pawl means substantially prevents rotation of said rotor with respect to said stator assembly.

11. The electric motor in accordance with claim 10, wherein said stop member comprises a slip clutch including a friction plate affixed to said rotor shaft, and a clutch plate spring-biased into frictional engagement with said friction plate, said rotor shaft being rotatable with respect to said clutch plate only when the torque of said rotor shaft exceeds a predetermined torque-carrying capacity for the slip clutch, said clutch plate lobe including a lobe portion adapted to engage said pawl means in the second, engaged position thereof so that said slip clutch permits rotation of said rotor with respect to said motor frame after engagement of said clutch plate portion with said pawl means only if the torque of said rotor shaft exceeds the torque-carrying capacity of said slip clutch.

12. The electric motor in accordance with claim 11, including a stop plate connected to said motor frame and spaced from said stator assembly, said rotor shaft extending through said stop plate, said pawl means being generally disposed on the side of said stop plate facing said stator assembly, said rotation preventing means comprising a portion of said pawl means adapted to engage said stop plate for preventing rotation of said pawl means with respect to said motor frame, said pawl means further including a pawl portion adapted to extend through said stop plate in the second, engaged position of said pawl means, wherein said pawl portion is disposed within the rotational path of said lobe portion, said stop member being disposed on the other side of said stop plate generally opposite said pawl means.

13. The electric motor in accordance with claim 11 or 12, wherein said slip clutch further includes a hub affixed to said rotor shaft, said friction plate being affixed to said hub and said clutch plate being mounted on said hub, and spring means operatively disposed between said hub and said clutch plate for urging said clutch plate into frictional engagement with said friction plate.

14. The electric motor in accordance with claim 10, wherein said biasing means are adapted to provide a biasing force on said pawl means when said pawl means are in said first, disengaged position which is equal to the force exerted on said pawl means by the magnetic field created by said stator assembly.

15. The electric motor in accordance with claim 10, and shock absorption means adapted to operate in association with said pawl means attendant to movement of said pawl means to said second, engaged position.

16. An electric motor having a braking arrangement, comprising:

a motor frame;

a stator assembly connected to said frame:

a rotor extending through said stator assembly including a rotor shaft and a rotor core affixed to said rotor shaft, said motor frame supporting said rotor for rotation with respect to said stator assembly and said motor frame;

slip clutch means carried by and retatable with said rotor shaft during operation of said motor, said clutch means including friction plate means affixed to said rotor shaft, and clutch plate means spring-biased into frictional engagement with said friction plate means, said rotor shaft being rotatable with respect to said clutch plate means only when the torque of said rotor shaft exceeds a predetermined torque-carrying capacity of said slip clutch means; and pawl means associated with said motor frame and held against rotation with respect thereto, said pawl means being movable in an axial direction with respect to said rotor shaft in response to a magnetic field created during motor operation from an engaged position wherein said clutch plate means is adapted to engage said pawl means so that said slip clutch means is operatively connected to said motor frame and substantially prevents rotation of said rotor, to a disengaged position wherein said pawl means is disposed outside of the rotational path of said clutch plate means so that said motor is freely rotatable.

17. The electric motor in accordance with claim 16, wherein, said pawl means is associated with said rotor shaft whereby said rotor shaft guides said pawl means during movement thereof in an axial direction with respect to said rotor shaft, said magnetic field created during motor operation being created by said stator assembly for moving said pawl means to said disengaged position.

18. The electric motor in accordance with claim 17, wherein said pawl means is mounted on said rotor shaft for axial movement with respect thereto, and comprises an armature of ferrous material, said braking arrangement comprising biasing spring means for urging said pawl means to said engaged position when motor operation ceases.

* * * * *

UNITED STATES PATENT AND TRADEMARK OFFICE
CERTIFICATE OF CORRECTION

PATENT NO. : 4,460,838
DATED : July 17, 1984
INVENTOR(S) : Dennis J. Ulicny

It is certified that error appears in the above-identified patent and that said Letters Patent is hereby corrected as shown below:

```
Column 10, line 15, the word "retation" should be
           "rotation".
           line 43, the word "Am" should be "An".
Column 12, line 13, after "plate", delete the word
           "lobe".
           line 18, after "plate" insert the word
           "lobe".
Column 13, line 1, the word "retatable" should be
           "rotatable".
Column 14, line 2, the word "motor" should be
           "rotor".
```

Signed and Sealed this

Twenty-sixth Day of February 1985

[SEAL]

Attest:

DONALD J. QUIGG

*Attesting Officer*  *Acting Commissioner of Patents and Trademarks*